United States Patent [19]

Michaelis

[11] Patent Number: 4,593,193

[45] Date of Patent: Jun. 3, 1986

[54] APPARATUS AND METHOD FOR GENERATING CALIBRATED OPTICAL ENCODER PULSES

[75] Inventor: Theodore D. Michaelis, Medford, N.J.

[73] Assignee: RCA Corporation, Princeton, N.J.

[21] Appl. No.: 499,795

[22] Filed: May 31, 1983

[51] Int. Cl.[4] .............................................. G01D 5/34
[52] U.S. Cl. .............................. 250/231 SE; 364/571
[58] Field of Search ..................... 250/231 SE, 237 G; 340/347 P; 318/313, 341; 356/395; 364/571; 360/73; 358/322, 342

[56] References Cited

U.S. PATENT DOCUMENTS

| | | | |
|---|---|---|---|
| 4,064,504 | 12/1977 | Lepetit et al. | 340/347 P |
| 4,286,790 | 9/1981 | Siryj et al. | 369/36 |
| 4,413,212 | 11/1983 | Okamoto et al. | 318/317 |
| 4,441,061 | 4/1984 | Yoshida et al. | 318/329 |

FOREIGN PATENT DOCUMENTS 2006481A 5/1979 United Kingdom .

Primary Examiner—David C. Nelms
Assistant Examiner—James Gatto
Attorney, Agent, or Firm—Joseph S. Tripoli; Robert L. Troike; Christopher L. Maginniss

[57] ABSTRACT

Timing pulses generated by an incremental optical encoder disc may be nonuniformly spaced due to eccentricity in the disc mounting and inaccuracies in the pulse generating marks. An apparatus and method are disclosed wherein pulse width measurements are made during one revolution of the disc, and from these measurements data relating to pulse delay information are computed and stored in a memory. During operation the leading edge of each encoder pulse is delayed by a period of time related to the stored delay information corresponding to that specific pulse.

22 Claims, 3 Drawing Figures

APPARATUS AND METHOD FOR GENERATING CALIBRATED OPTICAL ENCODER PULSES

The Government has rights in this invention pursuant to a government contract.

The present invention relates to record disc systems for use in recording and retrieving information from a rotating disc record and, more particularly, to an apparatus and method for correcting inaccuracies in the displacement information provided by an incremental optical encoder, which information is used in rotational speed control.

In a high-speed data storage and retrieval system for use with disc record media, which can be of the general type disclosed in U.S. Pat. No. 4,286,790, "Optical Disc Changer Apparatus," issued Sept. 1, 1981, to B. W. Siryj and A. D. Gilson, and assigned to the same assignee as the present invention, the disc records are typically driven by an air bearing turntable servo motor controlled in a phase lock loop. The feedback device used for speed control is most often an incremental optical encoder.

One example of such an encoder is an optical encoder disc which typically is a disc affixed to the motor shaft so as to rotate therewith. The disc includes strips of optically transmissive material alternating with strips of optically non-transmissive material, wherein the strips are disposed radially within a band (or track) which is substantially concentric with the axis of rotation. A source of light radiation is positioned on one side of the disc adjacent to the track and a light detector is located in a corresponding position on the opposite side of the encoder disc. As the disc rotates, the detector sees bursts of light at a repetition rate in proportion to the disc rotational frequency. Hence, the electrical output signal of the detector comprises a plurality of pulses which provide displacement information relating to motor shaft position and can be used in a servo system to control motor speed.

Typical encoder discs include a plurality of such tracks wherein the number of alternating transmissive and non-transmissive zones bears a binary-coded relationship between such tracks, thus providing absolute displacement information. Many such discs also include a track with a single mark to thereby provide a single reference pulse for each rotation of the motor. In the example to be used in describing the present invention, a single encoder disc track is used, which track provides 1,024 encoder pulses in each complete rotation.

Encoder pulses must represent an extremely accurate indication of angular displacement in order to provide a system with uniform velocity and low velocity jitter. Two factors contribute to inaccuracies in this regard: (1) lack of exactitude in the width and spacing of the pulse-generating marks, and (2) eccentricity in the track of the pulse-generating marks relative to the axis of rotation. The former inaccuracy may be minimized by a larger, more costly encoder disc, and the latter may be minimized by more costly and time-consuming disc alignment techniques. Encoder disc eccentricity results in an error curve having a generally sinusoidal shape, and causes velocity jitter, motor heating and slow lock on performance (because the eccentricity error utilizes a large portion of the servo dynamic range). The error curve due to inaccurately spaced pulse-generating marks is a random function.

The present invention overcomes these disadvantages by measuring the correcting the encoder pulses. In fact, the apparatus and method disclosed can accept a relatively wide range of encoder pulse spacing inaccuracy and track eccentricity while providing a calibrated output signal of uniformly spaced pulses.

In accordance with the principles of the present invention, an apparatus is disclosed for use in a system which includes means for generating an electrical signal comprising continuously repeating sequences of pulses, wherein the pulses within each of the sequences are not equally spaced. The system further includes storage means containing a plurality of data words, each data word representative of the time duration by which a corresponding one of the pulses deviates from the mean pulse spacing of the sequence. The disclosed apparatus responds to the signal and to the stored data words to time-shift the occurrences of each of the pulses so as to provide substantially equal spacing between them. The apparatus includes means for converting each of the data words into a corresponding time period and means for altering the signal by delaying the occurrences of each of the pulses by its corresponding time period.

Other features and advantages of the invention will be more fully understood from the following detailed description of the preferred embodiment, the appended claims and the accompanying drawing in which:

Figure 1:
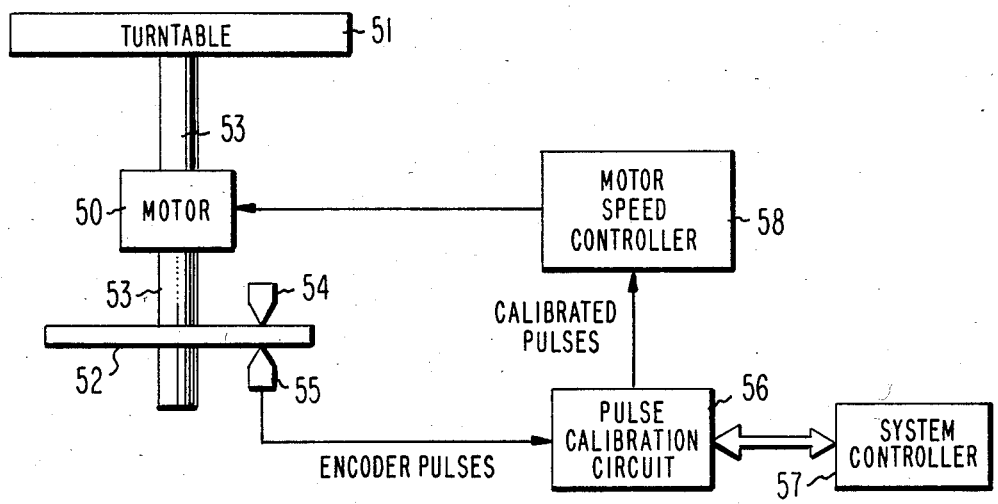
FIG. 1 is a block diagram of a system in which the present invention finds application.

Reference is first made to FIG. 1, which illustrates a system including a motor-driven turntable and encoder disc. Motor 50 drives turntable 51 and angular encoder disc 52 which are coupled to motor shaft 53. Light source 54 directs a beam of light onto one surface of encoder disc 52, to which light detector 55, located on the other side of disc 52, responds by generating the ENCODER PULSES signal which is applied to pulse calibration circuit 56. Circuit 56 works in conjunction with system controller 57 to generate the CALIBRATED PULSES signal to motor speed controller 58 which, in turn, determines the rotational speed of motor 50.

Figure 2:
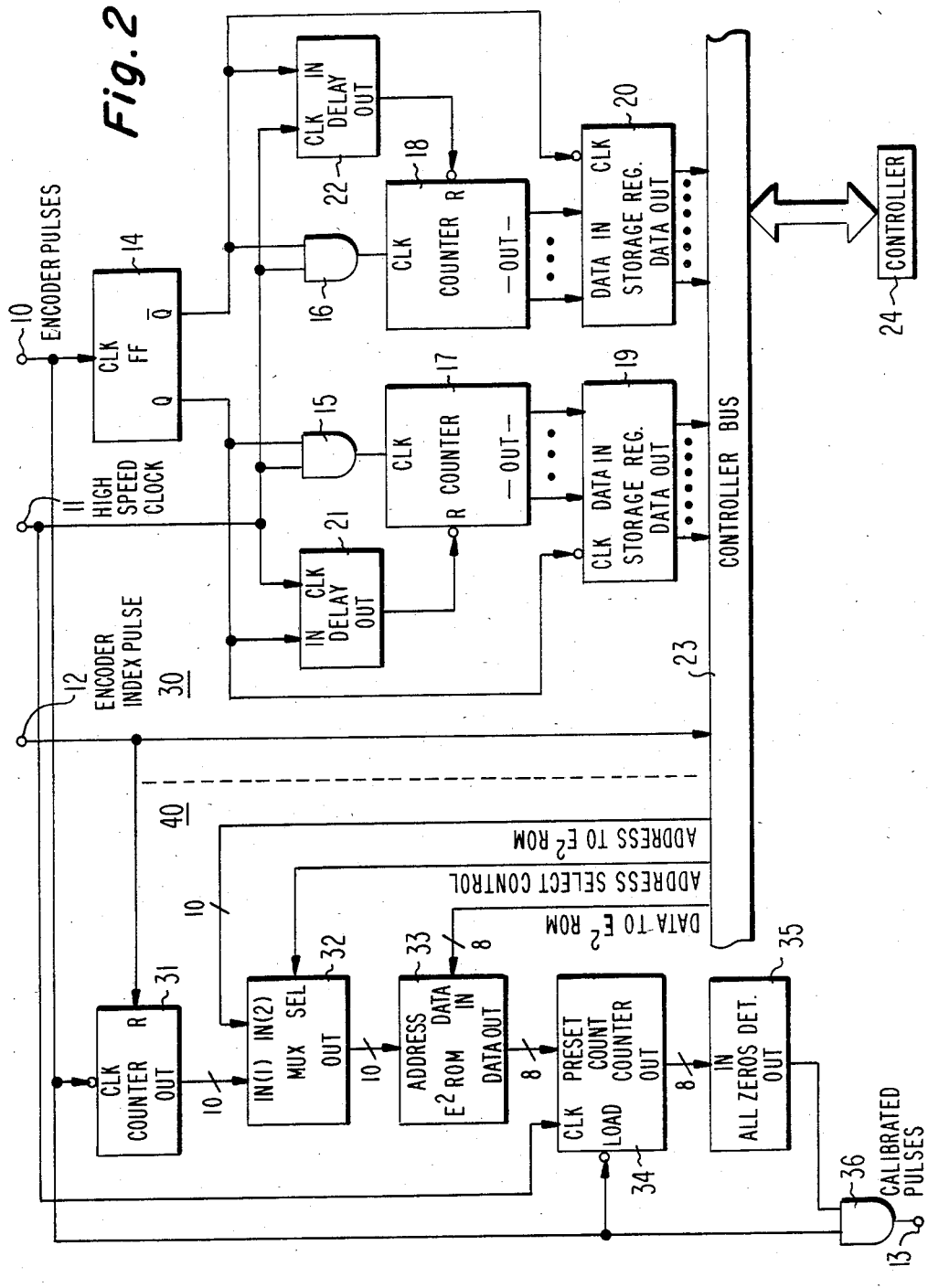
FIG. 2 is a detailed block diagram representation, illustrating the functional aspects of the present invention.

Referring now to FIG. 2, a detailed block diagram of a preferred embodiment of the present invention is illustrated. The diagram includes a pulse measuring circuit 30, shown generally on the right side of the vertical dashed line, and pulse calibration circuit 40, shown generally on the left side of the dashed line. Both of these circuits are coupled to controller 24 via controller bus 23. The functions provided by controller 24, as hereinafter described, may be included within the operations of the system computing facility, usually employed for other purposes such as record disc data processing, at such times when it is normally idle.

Considering first the pulse measuring circuit 30, the ENCODER PULSES signal provided from, for example, optical encoder disc 52 (shown in FIG. 1) and applied at input terminal 10, is coupled to the clock (CLK) input terminal of flip-flop 14. Flip-flop 14 is of a type which changes state on every positive transition of the signal at its CLK input terminal, i.e., the signals at its Q and Q output terminals are alternately and correlatively high and low. AND gate 15 gates the HIGH SPEED CLOCK signal, applied at input terminal 11, to the CLK input terminal of counter 17 when the signal at the Q output terminal of flip-flop 14 is high, i.e., when flip-flop 14 is set. Similarly, AND gate 16 gates the HIGH SPEED CLOCK signal to the CLK input terminal of counter 18 when flip-flop 14 is reset.

The count accumulated in counter 17, which appears as digital signals at the OUT terminals, is applied to the DATA IN input terminals of storage register 19, and is clocked therein as flip-flop 14 resets, by virtue of the flip-flop Q output signal applied to the inverting CLK input terminal of storage register 19. The contents of register 19, which appear as digital signals at the DATA OUT output terminals, are coupled to controller 24 via controller bus 23. Similarly, the accumulated count in counter 18 is clocked into storage register 20 as flip-flop 14 sets, and is coupled to controller 24 from register 20 via bus 23.

Delay circuit 21 receives the signal from the Q output terminal of flip-flop 14 at its IN terminal and adds a fixed delay before providing that signal at its OUT terminal. The delay time is dependent upon the HIGH SPEED CLOCK signal applied to its CLK input terminal. The OUT terminal is coupled to the inverting reset (R) input terminal of counter 17 such that counter 17 is held reset for a fixed delay time beyond the setting of flip-flop 14. A similar delay circuit 22 is similarly provided between the Q output terminal of flip-flop 14 and the R input terminal of counter 18 such that counter 18 is held reset for a fixed delay time subsequent to the resetting of flip-flop 14.

As will become apparent in a later discussion, the delays provided by delay circuits 21 and 22 should be substantially equal. Hence, one-shot circuits, dependent upon capacitors and resistors for their delays, may not be desirable in this type of application. Instead, purely digital circuits are recommended, such as shift registers or counters, which are dependent only on the frequency of a common CLK input signal, to provide delays which are reliably equal.

Considering next pulse calibration circuit 40, the ENCODER PULSES signal is applied to the CLK input terminal of counter 31 which, in the present example, is a ten-stage counter whose ten output signals appear at its OUT terminals. The counting function occurs on each falling edge of the ENCODER PULSES signal. Counter 31 is reset to zero at each occurrence of the ENCODER INDEX PULSE signal provided at input terminal 12, and applied to the R input terminal of counter 31. The index pulse is a reference signal from encoder disc 52 to provide absolute positional information on disc 52. The ten outputs of counter 31 are coupled to a first set of ten input terminals, collectively referred to as IN(1), of multiplexer 32. The signals coupled to the second set of ten multiplexer 32 input terminals, IN(2), are supplied by controller 24 via bus 23, as is the signal applied to the select (SEL) input terminal, which signal determines the input set (as between the signals applied to IN(1) and IN(2)) to be steered to the OUT terminals of multiplexer 32.

Electrically erasable read-only-memory ($E^2ROM$) 33 receives the ten output signals from multiplexer 32 at its ten ADDRESS input terminals. As a result, the data stored in the location accessed by that address appear at the DATA OUT terminals. In the present example, $E^2ROM$ 33 is a 1K-by-8 bit memory; thus there are eight data output signals. Memory 33 is initially loaded at its eight DATA IN terminals with data provided from controller 24 via bus 23, with address control provided from the same source through multiplexer 32.

The eight memory 33 data output signals are applied to the eight PRESET COUNT input terminals of presettable down counter 34, which loads the data in on the low cycle of the ENCODER PULSES signal applied at the LOAD input terminal. During the time that the signal at the LOAD terminal is low, the counting function of counter 34 is inhibited. When the ENCODER PULSES signal is high, the HIGH SPEED CLOCK signal, applied at the CLK input terminal, causes counter 34 to count down. The eight output signals at the OUT terminals of counter 34 are coupled to the eight IN terminals of all zeros detector circuit 35, which provides a high signal at its OUT terminal when the count has reached zero. This signal enables AND gate 36 to provide the ENCODER PULSES signal at output terminal 13, thereby forming the CALIBRATED PULSES signal which is applied to motor speed controller 58 (on FIG. 1).

The operation of the embodiment of FIG. 2 may be divided into four sequences. The first sequence relates to measuring the encoder pulse spacings over the period of one revolution of encoder disc 52. The second sequence, performed solely within controller 24, is a computational function to determine the deviation of each pulse width from the mean. The third sequence involves the transfer of the data computed during the second sequence to memory 33, and the fourth sequence relates to the generation of calibrated delays and their application to corresponding encoder pulses to thereby provide uniform pulse spacing. The first, second and third sequences are the initialization procedures and are required only once, each time encoder disc 52 is mounted on shaft 53 of drive motor 50. Once initialized, the fourth, or operational, sequence is executed continuously to provide pulse width correction.

In the discussion that follows, the example to be used involves an encoder disc 52 having 1,024 pulse generating marks disposed in a track generally concentric with its axis of rotation, driven by motor 50 at an initial rate of 30 Hz. The frequency of the HIGH SPEED CLOCK signal 30 MHz. It is assumed that no pulse width deviation will ever exceed 5% of the mean.

The pulse measuring sequence begins when, with motor 50 operating at a constant speed, the motor current supply is cut off, permitting motor shaft 53 to coast. It is obviously necessary that encoder disc control of the motor speed be disabled during such a measurement, but the additional step of cutting off motor current permits measurements unaffected by motor torque perturbations. The first pulse measurement occurs when controller 24 recognizes, via a signal applied to bus 23, the ENCODER INDEX PULSE, and denominates the corresponding pulse on the ENCODER PULSES signal as pulse #1. The leading edge of pulse #1 changes the state of flip-flop 14. (Let us assume, for purposes of this discussion, that flip-flop 14 is set by this leading edge).

The setting of flip-flop 14 enables the HIGH SPEED CLOCK signal to the CLK input of counter 17 via AND gate 15. However, counter 17 is held reset by delay circuit 21 until the high signal at its input is propagated through to its output. The purpose of delay circuits 21 and 22 is to avoid the handling of large numbers in counters 17 and 18, registers 19 and 20, and controller 24. At a rotational speed of 30 Hz, there are nominally 976 counts of the HIGH SPEED CLOCK signal. By the use of delay circuits 21 and 22 injecting delays, for example, of 896 such counts, more manageable numbers can be utilized, with no loss of precision. (This is a convenient number for use with a delay circuit comprising a binary counter, as $896 = 2^7 + 2^8 + 2^9$). Thus, counters 17 and 18 may comprise eight-stages, and storage registers 19 and 20 need store only eight bits each.

On the leading edge of the next ENCODER PULSE, pulse #2, flip-flop 14 resets, causing the count in counter 17 to be clocked into register 19, where controller 24 reads the count from bus 23. The resetting of flip-flop 14 additionally enables the HIGH SPEED CLOCK signal to the CLK input of counter 18 via AND gate 16, and the counting begins after signal propagation through delay circuit 22. The final count in counter 18 is clocked into register 20 when flip-flop 14 is triggered by the leding edge of pulse #3.

This procedure is repeated until all pulses, 1,024 in the present example, have been counted and the counts corresponding to each pulse length have been presented to and stored within controller 24. The first sequence, pulse width measurement, is thus completed, requiring only a small fraction of a second for the entire operation.

Figure 3:
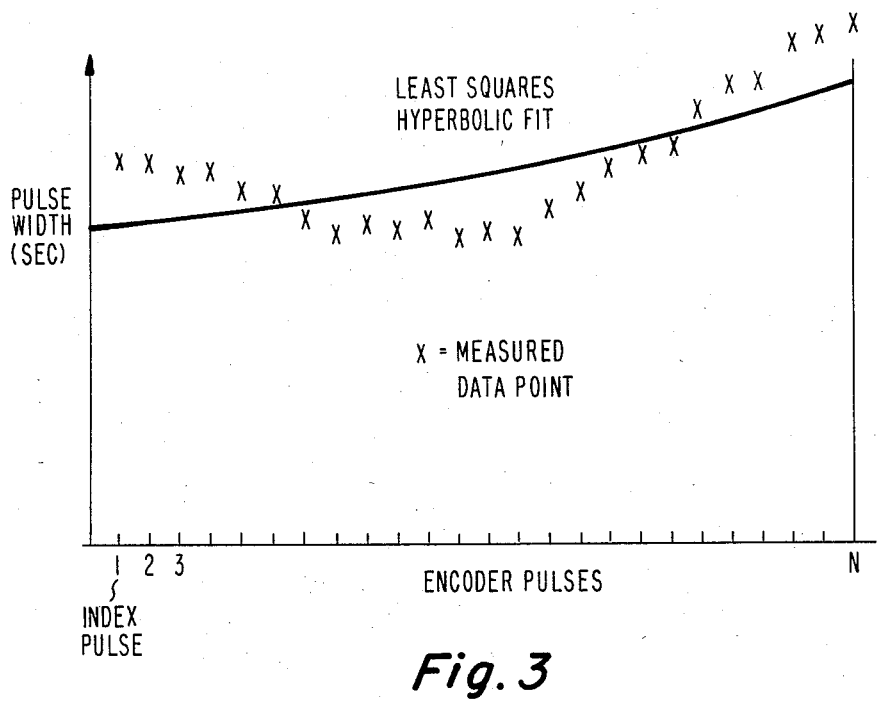
FIG. 3 is a graph depicting, for one example, relative encoder pulse lengths during one revolution of an encoder disc.

The next sequence is a purely computational sequence, executed entirely by controller 24, to determine a mean curve for the stored pulse widths. Controller 24 contains a body of data which, if plotted, would resemble the generally sinusoidal curve comprising the "x's" of FIG. 3. The ordinate of this graph is expressed as a unit of time, but it might just as accurately be expressed in terms of HIGH SPEED CLOCK counts.

The mathematical technique of fitting a set of data points to a chosen curve according to the least squares criterion for best fit is referred to as regression analysis. By fitting data to a curve is meant only the process of calculating the values of the constants or parameters of the curve in such a manner as to minimize the sum of the deviations squared. See generally, N. R. Draper & H. Smith, "Applied Regression Analysis," 2d ed., 1981, New York, John Wiley & Sons; and T. S. Arthanari & Y. Dodge, "Mathematical Programming in Statistics," 1981, New York, John Wiley & Sons.

In the present case, it may be assumed that a single revolution of high-inertia motor shaft 53 and encoder disc 52, supported by an air bearing to provide minimal friction effects, occurs with a slight linear decrease in velocity. Thus, because of the inverse relation between velocity and time in the equation for constant displacement, the best curve for fitting the time measurements must necessarily be an hyperbola. Hence, the least squares hyperbolic fit curve is superimposed on the measured data points of FIG. 3.

Once the least squares hyperbolic fit curve is generated, controller 24 calculates the distance of each pulse sample from the curve, while maintaining the sign of the distance. Each such distance is normalized to the nominal operating speed, 30 Hz in the present example, by multiplying this distance by the ratio of the mean pulse width at operating speed to the pulse width represented by the point on the curve in correspondence with the measured data point. This would be represented in equation form as:

distance (normalized) = distance (sampled) × pulse width (at 30 Hz)/pulse width (on curve).

Each of these normalized distances will henceforth be referred to as the deviation, $d_i$, of the pulse length from the mean. A table is then compiled, comprising 1,024 entries, which is the running sum of all previous deviations. A positive constant, C, is chosen which is just greater in magnitude than the most positive of the sums of the previously compiled table, and a final table, consisting of 1,024 delay entries, is formulated by substracting from the constant C the running sum table entry corresponding to the previous pulse. Thus, the mathematical expression for the delay to be introduced to the leading edge of the nth pulse, $\Delta_n$, is:

$$\Delta_n = C - \sum_{i=1}^{n-1} d_i. \quad (1)$$

It can be seen that $$\Delta_1 = C$$
$$\Delta_2 = C - d_1$$
$$\Delta_3 = C - (d_1 + d_2)$$
$$\vdots$$

A simple example would be most helpful in explaining the above-described procedures. Let us assume an encoder disc with eight pulse-generating marks, and assume that the leading edges of the eight pulses occur at the following times (in fictional time units):

0 103 204 304 400 497 596 696 800

The pulse widths are determined to be:

103 101 100 96 97 99 100 104

In order to simplify this example, a straight line, zero slope, curve is fit to the data. It is readily seen that, for this required curve, the mean pulse width is 100, and the deviations, $d_i$, from the mean are:

+3 +1 0 −4 −3 −1 0 +4

The running sum of deviations would be entered as:

+3 +4 +4 0 −3 −4 −4 0

Selecting a value for C which is greater than the most positive entry in the above table, C is chosen as 5. Thus, applying Equation (1), the following table of delays, $\Delta_i$, is compiled:

+5 +2 +1 +1 +5 +8 +9 +9

Applying these delays to the leading edges of the pulses listed above, adjusts the leading edges to the following:

5 105 205 305 405 505 605 705

It is readily apparent that these adjusted leading edges provide pulses which are equally spaced.

The generation of the delay table, comprising the $\Delta_i$ entries, concludes the computational sequence of the operation of this invention. Like the pulse measurement sequence, this sequence can be carried out by controller 24 within a small fraction of a second.

During the third sequence, the entries in the delay table are transferred to memory 33. This sequence involves only controller 24, bus 23, multiplexer 32 and memory 33. Controller 24 sets the ADDRESS SELECT CONTROL signal so that the data presented at the IN(2) input terminals of multiplexer 32 are steered to its OUT terminals. Controller 24 then directs memory addresses on the ten ADDRESS TO E$^2$ROM signal lines, through multiplexer 32, to the ten ADDRESS input terminals of memory 33. Simultaneously, controller 24 places delay table entries, in units corresponding to a HIGH SPEED CLOCK signal rate of 30 MHz, in the present example, on bus 23 where they are applied to the eight DATA IN input terminals of memory 33. In this manner the 1,024 delay table entries are written into corresponding locations within memory 33 to be used during the operational sequence of the present invention. The third sequence, the data transfer sequence, is the only one of the three initialization sequences requiring a substantial amount of time. It is estimated that the time needed to erase a 1K-by-eight bit E$^2$ROM and reprogram the 1,024 bytes is in the order of 10-15 seconds.

It is worthy of note that the time relationship between the occurrences of the respective leading edges of ENCODER INDEX PULSE and ENCODER PULSE #1 determines how the delay entries are written into memory 33 locations. In the configuration as shown in FIG. 2, if the leading edge of ENCODER INDEX PULSE occurs sufficiently in advance of the leading edge of pulse #1 on the ENCODER PULSES signal, then the delay entry corresponding to pulse #1 is entered in the memory 33 storage location accessed by address 0, the pulse #2 delay entry is entered in the storage location accessed by address 1, etc. If, however, the leading edge of ENCODER INDEX PULSE occurs substantially simultaneously with, or following, the leading edge of pulse #1 of the ENCODER PULSES, then the delay entry corresponding to pulse #1 is entered in the memory 33 storage location accessed by address 1, the pulse #2 delay entry is entered in the storage location accessed by address 2, . . . , and the pulse #1,024 delay entry is entered in the storage location accessed by address 0.

The fourth sequence is the operational sequence, with motor current restored, in which nonuniformly-spaced pulses received on the ENCODER PULSES signal from rotating encoder disc 52 are corrected to provide uniform spacing therebetween, according to data computed by controller 24 and stored in memory 33 during the first three sequences. Referring again to FIG. 2, the leading (positive-going) edge of a pulse on the ENCODER PULSES signal relieves counter 34 of its LOAD command, thereby permitting it to count down. When the all zeros detector circuit 35 determines that counter 34 has counted down to zero, circuit 35 generates a signal to AND gate 36 enabling the ENCODER PULSES signal onto output terminal 13 with a delayed leading edge on its pulse. The delay provided by counter 34, as a result of its preset count, calibrates each encoder pulse such that it is uniformly spaced from the leading edge of the preceding pulse.

The trailing (negative-going) edges of the ENCODER PULSES signal trigger counter 31 and thereby increment its count. This count is applied, through multiplexer 32, to the ADDRESS input terminals of memory 33, and the data stored in the location corresponding to this address appears on the DATA OUT terminals where they are applied to the PRESET COUNT input terminals of counter 34. These data are loaded into the preset register of counter 34 by virtue of the low input signal applied at its LOAD input terminal, which low signal nullifies the effect of the HIGH SPEED CLOCK signal at its CLK input terminal. Thus, the counting is held off until after the leading edge of the ENCODER PULSES signal.

The occurrence of the ENCODER INDEX PULSE resets counter 31 to zero, resulting in the accessing of memory 33 data contained at address 0, thereby providing a reference to correlate the individual pulses of the ENCODER PULSES signal with the delay data stored in memory 33.

It should be noted that the pulse correction data stored in memory 33 is wedded to a 30 MHz HIGH SPEED CLOCK signal coupled with encoder disc 52 rotational speed of 30 Hz. Variable speed operation may be accommodated by synchronizing the frequency of the HIGH SPEED CLOCK signal, when used to count down the delay, to a phase lock clock typically used to command loop operation. While it is true that under transient conditions, when the encoder frequency does not match the command frequency, the calibration system will be in error, it is not necessary to maintain precise speed control at such times. An alternative scheme would be to synchronize the delay counting clock signal to the encoder itself, thereby ensuring uniform pulse spacings at all rotational speeds.

What is claimed is:

1. In a system including means for generating an electrical signal comprising continuously repeating sequences of pulses and wherein the pulses within each of said sequences are not equally spaced, said system further including storage means containing a plurality of data words, each data word representative of the time duration by which the occurrence of a corresponding one of said signal pulses deviates from the time at which said one signal pulse would occur if said pulses of said sequence were substantially uniformly spaced, an apparatus responsive to said signal and to said data words for time-shifting the occurrences of each of said signal pulses to thereby provide substantially equal spacing therebetween, said apparatus comprising:

means for converting each of said data words corresponding to one of said pulses into a timing pulse having a pulse width duration related to said data word; and means for altering said signal by delaying the occurrences of each of said signal pulses by the duration of said corresponding timing pulse.

2. The apparatus according to claim 1 wherein said converting means includes:

counter means responsive to said data words of said storage means; and detector means responsive to the count of said counter means for generating an enabling signal when said counter means has counted to a predetermined reference value.

3. The apparatus according to claim 2 wherein said counter means is a presettable down counter, responsive at its preset input terminals to said storage means data words, and wherein said reference value is zero.

4. The apparatus according to claim 2 wherein said altering means includes a gate coupled at a first input terminal to said signal comprising continuously repeating sequences of pulses and at a second input terminal to said enabling signal.

5. An apparatus responsive to the detected output signal pulses of a rotating angular optical encoder for generating a signal having uniformly-spaced pulses, which pulse spacing is the average of the time durations between successive pulses of said encoder signal, said apparatus comprising:
   means for measuring the time durations between successive occurrences of said detected encoder output signal pulses;
   means for determining the points of a curve based on a plot of said measured time durations correlated to said pulses and for computing individual delay times from said curve to be applied to each of said detected encoder output signal pulses;
   means for inputting signals corresponding to said individual delay times to a delay timer just prior to the occurrence of said corresponding detected encoder output signal pulse; and
   means responsive to said detected encoder output signal pulses and the output signals of said delay timer for generating said signal having uniformly-spaced pulses.

6. The apparatus according to claim 5 wherein said measuring means includes two counters for counting pulses of a high speed clock during alternate occurrences of said detected encoder output signal pulses.

7. The apparatus according to claim 5 wherein said inputting means includes storage means and wherein said signals coresponding to said individual delay times are transferred from said computing means to said storage means and are stored as data words in individual locations within said storage means.

8. The apparatus according to claim 7 further including counter means responsive to said detected encoder output signal pulses for advancing the count therein, said counter means output signal being coupled to said storage means to thereby address individual storage locations therein.

9. The apparatus according to claim 7 wherein said delay timer is a presettable down counter coupled at its preset inputs to the output terminals of said storage means, said presettable down counter responsive at a control terminal to said detected encoder output signal pulses, whereby signals coupled to said down counter at said preset inputs are loaded into said down counter only when said detected encoder output signal pulses are not present and whereby said down counter is enabled to count only when said detected encoder output signal pulses are present.

10. The apparatus according to claim 9 wherein said generating means includes detector means responsive to the count of said presettable down counter for generating an enabling signal when said down counter has counted to zero.

11. The apparatus according to claim 10 wherein said generating means further includes a gate coupled at a first input terminal to said detected encoder output signal pulses and at a second input terminal to said enabling signal to thereby provide at its output terminal said signal having uniformly-spaced pulses.

12. The apparatus according to claim 5 further including a delay circuit coupled to said measuring means for shortening each pulse of said detected encoder output signal applied to said measuring means, wherein each pulse is shortened by an equal amount.

13. The apparatus according to claim 12 wherein said measuring means includes two counters for counting the pulses of a high speed clock during said detected encoder output signal pulses shortened by said delay circuit.

14. A method for uniformly spacing the output signal pulses of a rotating angular optical encoder, comprising the steps of:
   (a) measuring the time durations between successive occurrences of said pulses;
   (b) constructing a curve from a plot of said measured time durations correlated to said pulses;
   (c) computing individual delay times from said curve to be applied to each of said pulses;
   (d) inputting a signal corresponding to one of said individual delay times to a delay timer just prior to the occurrence of a corresponding one of said pulses; and
   (e) inhibiting the occurrence of each of said pulses while said delay timer is counting.

15. The method according to claim 14 wherein said measuring is accomplished by two counters which count high speed clock pulses during alternate occurrences of said encoder output signal pulses.

16. The method according to claim 14 wherein said curve is constructed according to a least squares fit.

17. The method according to claim 14 wherein said measuring is accomplished while said encoder is coasting without any driving stimulus.

18. The method according to claim 17 wherein said curve is constructed according to a least squares fit.

19. The method according to claim 18 wherein said curve is an hyperbola.

20. The method according to claim 14 wherein the step of computing individual delay times includes the steps of:
   calculating the deviations between each of said measured times and the corresponding points on said curve;
   compiling a table having entries corresponding to each of said encoder output signal pulses, wherein said entries comprise the sum of the deviations corresponding to all of said pulses occurring previously; and
   adding a constant number to each of said table entries, wherein said constant number is chosen so as to make the results of all of said additions positive numbers.

21. The method according to claim 14 further including the step of storing data words corresponding to said individual delay times in corresponding individual locations of a memory.

22. The method according to claim 14 wherein said inhibiting step includes the steps of:
   permitting said delay timer to count only during the occurrence of said coresponding encoder output signal pulse; and
   generating an enabling signal when said delay timer has counted to a predetermined reference value, wherein said enabling signal gates said encoder output signal pulse to thereby provide an output signal having uniformly spaced signal pulses.

* * * * *